United States Patent [19]

Daniel, Jr. et al.

[11] Patent Number: 4,972,504
[45] Date of Patent: Nov. 20, 1990

[54] MARKETING RESEARCH SYSTEM AND METHOD FOR OBTAINING RETAIL DATA ON A REAL TIME BASIS

[75] Inventors: James N. Daniel, Jr., Northfield; Thomas F. Busyn, Wilmette; Brent T. Batterman, Gurney, all of Ill.

[73] Assignee: A. C. Nielsen Company, Northbrook, Ill.

[21] Appl. No.: 501,316

[22] Filed: Mar. 20, 1990

Related U.S. Application Data

[63] Continuation of Ser. No. 155,052, Feb. 11, 1988, abandoned.

[51] Int. Cl.$^5$ .................... H04B 17/00; H04B 5/00; H04N 7/02
[52] U.S. Cl. ........................................ 455/2; 455/41; 364/403; 364/918.5
[58] Field of Search ............... 455/2, 41; 379/92, 55; 358/84; 235/380, 381, 383, 385; 333/24 C, 254, 255, 260; 364/225, 226.3, 401, 402, 403, 404, 910, 918.1, 918.4, 918.5

[56] References Cited

U.S. PATENT DOCUMENTS

| | | | |
|---|---|---|---|
| 4,141,078 | 2/1979 | Bridges, Jr. et al. | 364/900 |
| 4,153,931 | 5/1979 | Green et al. | 364/200 |
| 4,331,973 | 5/1982 | Eskin et al. | 455/2 |
| 4,355,372 | 10/1982 | Johnson et al. | 379/92 |
| 4,546,382 | 10/1985 | McKenna et al. | 455/2 |
| 4,630,108 | 12/1986 | Gomersall | 455/2 |
| 4,636,950 | 1/1987 | Caswell et al. | 364/403 |
| 4,677,552 | 6/1987 | Sibley, Jr. | 364/401 |

OTHER PUBLICATIONS

*The Ethernet Sourcebook*; 1985; Shotwell et al.; p. 292.

*Primary Examiner*—Douglas W. Olms
*Assistant Examiner*—Ralph Smith
*Attorney, Agent, or Firm*—Mason, Kolehmainen, Rathburn & Wyss

[57] ABSTRACT

A market research retail sales data collection system and method includes a plurality of cooperating retail stores, each having an in-store device for automatically collecting processing and storing market research data in a substantially totally passive or non-invasive manner with respect to the on-going operations of each retail store. Each in-store device detects, interprets, processes and stores data on a real-time basis with respect to retail sales transactions occuring in the retail store. However, each such in-store device does not interfere with or require the active participation of the in-store Point-Of-Sale (POS) scanners/registers, POS controller or store computer controlling the normal operations of the retail store. Periodically, each in-store device transmits the data it has collected through a bidirectional comunications network to a central site. Each in-store device includes a non-invasive store loop sensor assembly, a sensor interface, a store loop communications adapter, a central processing unit, a random access memory, a processed data storage device, a power monitor and a communications modem for connecting the in-store device through a communications network to a central site. Each in-store device continuously monitors, detects, interprets, processes and stores retail sales transactions data from its retail store for subsequent transmittal to the central site. At the central site, the retail sales transactions data collected from each in-store device may be further processed and stored in any desired format for subsequent use by market researchers.

32 Claims, 4 Drawing Sheets

MARKETING RESEARCH SYSTEM AND METHOD FOR OBTAINING RETAIL DATA ON A REAL TIME BASIS

This application is a continuation of application Ser. No, 155,052, filed Feb. 11, 1988, now abandoned.

BACKGROUND OF THE INVENTION

A. Field of the Invention

The present invention generally relates to systems and methods for the collection of market research data from a plurality of cooperating retail stores each of which utilizes Point-Of-Sale (POS) optical scanners/registers and associated automatic controllers. More particularly, the present invention concerns a substantially totally passive or non-invasive automated system and method for collecting market research data on a real-time basis from a plurality of cooperating retail stores.

B. Description of the Prior Art

The collection, summarization and forwarding of Point-Of-Sale purchasing information from retail stores for purposes of market research are old and well-known, particularly since the advent of Point-Of-Sale (POS) optical scanners and the widespread use of the Universal Product Code (UPC) to identify retail products. Typically, retail purchase data is summarized by an in-store POS controller or by a separate store computer attached to the POS controller in the store or, if the store is part of a large retail store chain, by a central or host computer at the headquarters of the retail store chain. The summarized retail purchase data is then typically forwarded to the users of the data by any one of a number of different data storage and transmission techniques, for example, by magnetic tape or disk or diskette or by telephonic data transmission or by over-the-air data transmission.

Very often the market research purpose for the collection of such data is secondary to the primary purpose of assisting retail store operators and managers in product pricing and inventory control. Therefore, often the data collected and summarized does not meet the needs of market researchers.

The following prior art patents bear at least some relation to one or more of the disclosed features of the present invention:

| INVENTOR(S) | PAT. NO. | TITLE |
|---|---|---|
| Ritter | 3,619,783 | MEANS FOR DETERMINING TELEVISION CHANNEL USE IN A COMMUNITY ANTENNA TELEVISION SYSTEM |
| Haselwood et al | 3,651,471 | DATA STORAGE AND TRANSMISSION SYSTEM |
| Haselwood et al | 3,772,649 | DATA INTERFACE UNIT FOR INSURING THE ERROR FREE TRANSMISSION OF FIXED-LENGTH DATA SETS WHICH ARE TRANSMITTED REPEATEDLY |
| Larsen | 3,899,775 | AUTOMATIC STORE TRANSACTION SYSTEM AND TERMINAL THEREFOR |
| Miyake | 3,947,624 | SYSTEM FOR CONDUCTING A TELEVISION AUDIENCE SURVEY |
| Fuller | 4,014,004 | AUTOMATIC REPORT REGISTER |
| Porter | 4,044,376 | TV MONITOR |
| Thompson | 4,058,829 | TV MONITOR |
| Bridges, Jr. | 4,141,078 | LIBRARY CIRCULATION |

| INVENTOR(S) | PAT. NO. | TITLE |
|---|---|---|
| et al | | CONTROL SYSTEM |
| Eskin et al | 4,331,973 | PANELIST RESPONSE SCANNING SYSTEM |
| Cogswell et al | 4,331,974 | CABLE TELEVISION WITH CONTROLLED SIGNAL SUBSTITUTION |
| Johnson et al | 4,355,372 | MARKET SURVEY DATA COLLECTION METHOD |
| Asip et al | 4,361,851 | SYSTEM FOR REMOTE MONITORING AND DATA TRANSMISSION OVER NON-DEDICATED TELEPHONE LINES |
| Ohta | 4,361,903 | DATA TRANSMISSION PROCESS IN A CATV SYSTEM |
| Anderson et al | 4,377,870 | ELECTRONIC AUDIENCE POLLING SYSTEM |
| Wright, Jr. | 4,404,589 | CABLE TELEVISION WITH MULTIEVENT SIGNAL SUBSTITUTION |
| Abe et al | 4,471,491 | SERVICE CHANNEL SIGNAL TRANSMISSION SYSTEM |
| Gomersall et al | 4,500,880 | REAL TIME, COMPUTER-DRIVEN RETAIL PRICING DISPLAY SYSTEM |
| McKenna et al | 4,546,382 | TELEVISION AND MARKET RESEARCH DATA COLLECTION SYSTEM AND METHOD |
| Nickerson et al | 4,566,030 | TELEVISION VIEWER DATA COLLECTION SYSTEM |
| Pejas et al | 4,588,881 | SYSTEM FOR MONITORING THE MOVEMENTS OF GOODS INWARDS AND/OR OUTWARDS |
| Kurland et al | 4,603,232 | RAPID MARKET SURVEY COLLECTION AND DISSEMINATION METHOD |
| Eglise | 4,611,205 | DATA COLLECTION SYSTEM |
| Lurie | 4,626,904 | METER FOR PASSIVELY LOGGING THE PRESENCE AND IDENTITY OF TV VIEWERS |
| Gomersall | 4,630,108 | PREPROGRAMMED OVER-THE-AIR MARKETING RESEARCH SYSTEM |
| Caswell et al | 4,636,950 | INVENTORY MANAGEMENT SYSTEM USING TRANSPONDERS ASSOCIATED WITH SPECIFIC PRODUCTS |
| Roberts et al | 4,642,685 | STORING DATA RELATING TO TELEVISION VIEWING |
| Smith et al | 4,644,393 | MEANS FOR MONITORING PEOPLE WHO ARE WATCHING A TELEVISION SET |

The McKenna et al '382 patent concerns, inter alia, a data collection system for collecting at a central location television viewing data and retail purchase data from a plurality of cooperating households. Each of the households includes a hand held optical scanner for reading bar codes, i.e., UPC codes, associated with retail products purchased by the household. Scanned retail product purchase data and the television viewing data are stored in a common memory in the household and are periodically transmitted by telephone to a central site for processing and market research analysis.

The Eskin et al '973 patent, the Cogswell et al '974 patent and the Wright, Jr. '589 patent disclose, inter alia, a market research system utilizing a plurality of cooperating retail stores for obtaining and transmitting to a central location retail product purchase information concerning a plurality of cooperating panelists. The POS scanners in each of the cooperating retail stores scan bar encoded panelist identification cards and the UPC codes on the products purchased by each such panelist. Each retail store's in-store computer then stores a record of the products purchased by each such cooperating panelist, which record is subsequently transferred to a market research company at a remote location for analysis and possible correlation with television viewing data obtained from the same cooperating panelists.

The Gomersall '108 patent is directed to an over-the-air market research system and method and discloses, inter alia, the collection of retail product purchase information from a plurality of cooperating households by means of a UPC scanner provided to each household. Alternatively, such retail product purchase information may be obtained from cooperating retail stores in a test area. Each store's computer stores and periodically forwards a record of the retail products purchased by each cooperating household, identified by a scanned or manually entered identification code for each cooperating household, which information is periodically transmitted by telephone to a central computer for analysis by market researchers. The information transmitted typically includes at least an identification of the cooperating household, an identification of the retail product purchases made by that household and the identification of the retail store transmitting the data. As disclosed in the '108 patent, the data collected, stored and transmitted by each such store may also include the price of each retail product purchased, the date of the purchase and the time of the purchase.

The Larson '775 patent discloses, inter alia, an automatic store transaction system in which a keyboard is provided at each POS terminal for entering data. A transceiver is also provided at each POS terminal for transmitting data to and receiving data from a central processor. The system is particularly useful for inventory control and for providing data on sales rates and checker productivity.

The Johnson et al '372 patent, reissued as U.S. Pat. No. Re. 31,951, discloses, inter alia, a market research data collection system in which market research data, corresponding to the retail products purchased by a cooperating panelist, are transmitted by telephone from each cooperating household to a remotely located central computer for processing and market research analysis. The data collection system includes a hand held optical scanner located in each household for scanning and storing UPC codes and for entering and storing other related data, for example, the identification of the retail store at which the retail products were purchased.

In addition, several of the other above-identified patents concern systems and methods for transmitting data, such as television viewing data, from a plurality of remote locations to a central location for further processing. For example, the Ritter '783 patent discloses, inter alia, a system in which television viewing data is transmitted to a central location using either modulated RF signals or audio tones.

The Haselwood et al '471 and '649 patents disclose, inter alia, systems in which a computer at a central location periodically contacts by telephone each of a plurality of remotely located data storage and handling units in a plurality of cooperating households. Television viewing data are then transmitted from the remotely located data storage and handling units to the central location by telephone in the form of frequency modulated audio tones.

The Miyake '624 patent discloses, inter alia, a system in which television viewing data from one or more televisions in the household are transmitted in the form of a data pulse train from one transmitter over transmission lines to a survey center where the information is processed.

The Porter '376 patent and the Thompson '829 patent disclose, inter alia, television viewing data collection systems in which television viewing data from several television receivers in one household are transmitted to a single household data collector by, for example, a low power radio frequency transmitter. Subsequently, the accumulated television viewing data for the household is transmitted by telephone to a central location.

The Asip et al '851 patent discloses, inter alia, a data collection system for transmitting television viewing data by telephone to a central office computer.

The Ohta '903 patent discloses, inter alia, a bidirectional cable television system in which remote terminals in the system are polled by the cable head end for transmitting data thereto.

The Nickerson et al '030 patent discloses, inter alia, a television receiver monitoring system for collecting data concerning viewing habits and viewing preferences of television viewers located in a plurality of cooperating households and for transmitting that data by telephone to a central location for further processing and analysis. A remote unit in each remotely located cooperating household includes a microprocessor, a control memory, a data store memory and a modem for initiating a telephone call to the central location. The data store memory stores data concerning television channel selection and the times thereof and television viewer reaction data. At a preselected time, each such remote unit initiates a telephone call to the central location and transmits the collected data stored in the data store memory by telephone to the central location. During the telephone call, the central location can transmit new control information to each remote unit for storage at the remote unit and for controlling the operation of the remote unit until the time of the next telephone communication between the remote unit and the central location.

The Lurie '904 patent discloses, inter alia, a television viewing monitoring system for determining and storing the presence of individual television viewers by means of headphones that both receive the audio portion of a television broadcast and transmit by means of an infrared signal headphone identification data to the monitoring system when a particular headphone is in use.

The Roberts et al '685 patent discloses, inter alia, a television viewing data collection system in which television viewing data from a plurality of homes are transmitted to a central computer by means of a switched telephone network.

The Smith et al '383 patent discloses, inter alia, a system for monitoring the number of people watching a television receiver and for transmitting data relating to the number of people watching a television receiver by telephone to a central location for further processing.

The Fuller '004 patent discloses, inter alia, a mobile vehicle data storage and transmission system that utilizes a radio frequency transmitter-receiver.

The Bridges, Jr. et al '078 patent discloses, inter alia, a library book circulation control system utilizing optical scanners for reading bar codes associated with library books.

The Anderson et al '870 patent discloses, inter alia, an audience polling system for use by lecturers in which a number of wireless transmitters are used for transmitting audience responses to questions.

The Abe et al '491 patent discloses, inter alia, a service channel signal transmission system.

The Gomersall et al '880 patent discloses, inter alia, a computer operated retail pricing display system for displaying pricing and other information in real-time at the shelf or bin location of a product in a retail store.

The Pejas et al '881 patent discloses, inter alia, an inventory control system having an optical scanner for scanning bar codes associated with particular inventory items.

The Kurland et al '232 patent discloses, inter alia, a market survey collection and dissemination system that provides for the downloading of survey questionnaires from a central processor by telephone or by a cable television channel. The Eglise '205 patent discloses, inter alia, a system for auditing vending machines.

Finally, the Caswell et al '950 patent discloses, inter alia, an inventory control system that utilizes transponders associated with particular products for inventory control purposes.

In addition to the above-identified patents, several prior art systems have been commercially used in retail stores for collecting market research information of various types. For example, a system corresponding at least in part to that disclosed in the above-identified Eskin et al '973 patent and the Cogswell et al '974 patent and the Wright, Jr. '589 patent has been used to obtain market research data from a plurality of cooperating retail stores. The market research data obtained thereby, however, is obviously dependent upon cooperation by the store operators and upon the data collection and processing characteristics of each in-store computer or controller that controls the POS scanners/registers. Similarly, a prior art commercially operated system has been used in which a coupon dispensing device is positioned at each check-out counter in a retail store for dispensing a manufacturer's discount coupon to purchasers of products competitive with the manufacturer's product associated with the discount coupon. The latter system is believed to be electrically connected in the store loop, i.e., in the store data and control loop containing the POS scanners/registers and the in-store scanner controller and computer, thereby enabling the device to dispense coupons in response to the purchase of such competitive products. In addition, other prior art commercially available devices are designed to be electrically connected to the store loop and are used for many different purposes, such as for monitoring time and attendance of retail store cashiers.

While many of the above prior art systems and methods constitute significant improvements over prior manual systems and methods of collecting market research data, significant disadvantages exist with respect to many of the above prior art systems and methods. For example, there is a wide variety of manufacturers and types of POS systems for retail stores. Although each type of POS system performs the same basic functions as other POS systems, each different type of POS system performs those functions generally in a unique way. Consequently, the collection of market research data is limited by the methods and procedures in use in a particular POS system. An even greater variety of different summarization schemes in use in connection with such POS systems differing in, for example, level of detail, frequency of collection, speed of collection and accuracy of the collected data, complicates even further the collection of market research data from many retail stores. The physical logistics associated with collecting such data are immense in view of the fact that there are many thousands of retail stores from which market research data desirably is collected about tens of thousands of different retail products. Much highly desirable market research data also is lost or not collected as a result of the various existing summarization schemes in use by in-store controllers and computers or by central or host computers associated with the headquarters of a retail store chain.

Additionally, unacceptable time delays often occur between the occurrence of a retail sales transaction and the receipt of the sales transaction data by a market researcher. Furthermore, most existing market research in-store data collection systems require the active participation and cooperation of the store operators, including cooperation with respect to the use of special procedures, special scheduling and the use of the in-store controllers or computers. As a result, many retail store operators are unwilling to cooperate in collecting, storing and transmitting market research retail sales data due to the potential interference, real or imagined, with normal store operations.

Thus, a long-felt want and need has existed for a new and improved in-store market research retail sales data collection system and method that are substantially totally passive or non-invasive with respect to the regular operations and equipment of retail stores, thereby obviating the concerns referred to above of many store operators. Preferably, any such data collection system and method should also be independent of the in-store POS scanner/register controller and computer and also independent of host computers at the headquarters of retail store chains, thereby enabling market research data to be collected, stored and transmitted to a central location in accordance with the particular format found most advantageous by market researchers.

SUMMARY OF THE INVENTION

An object of the present invention is to provide a new and improved market research system and method.

Another object of the present invention is to provide a new and improved, non-invasive system and method for conducting market research with respect to products sold by a plurality of retail stores.

Another object of the present invention is to provide a new and improved system and method for conducting market research with respect to the purchasing habits of a plurality of cooperating consumers.

An even further object of the present invention is to provide a new and improved system and method for conducting market research with respect to the products purchased by customers of retail stores without requiring the active cooperation or participation by either the customers or the retail stores.

Another object of the present invention is to provide a new and improved system and method for conducting market research in which market research retail sales transaction data are collected on a real-time basis and transmitted in an expeditious manner to a central site for use by market researchers.

Finally, an additional object of the present invention is to provide a new and improved system and method for conducting market research through a network of cooperating retail stores in which accurate, verifiable retail sales transaction data are collected, processed and made available to market researchers independently of the activities of the retail stores or retail store chains.

Briefly, the present invention constitutes a new and improved system and method for conducting market research through a plurality of cooperating retail stores and, if desired, through a plurality of cooperating consumer panelists. In accordance with the present invention, disposed in each cooperating retail store is an in-store device for collecting, processing and storing on a real-time basis retail sales transaction data in a totally passive or non-invasive manner with respect to the on-going operations of the retail store. However, the in-store device does not interfere with or require the active participation of the in-store controller or computer controlling the normal operation of the one or more POS terminals in each retail store. Periodically, each in-store device transmits the retail sales transaction data it has collected through a bidirectional communications network to a central site for further processing and use by market researchers.

Each retail sales transaction detected, interpreted, processed and stored by the in-store device normally contains data corresponding to the identification of the retail store, the date of the transaction, the time of day of the transaction, the Universal Product Code (UPC) of the retail product involved in the transaction, the unit price of that product, the quantity purchased of that product, the identification of the POS terminal (scanner/register) at which the transaction occurred and a brief description of the product. Each such transaction may also include data corresponding to the unique identification code of a participating consumer panelist and may also reflect coupon redemptions, sales taxes, the method of payment, returns and/or voided purchases or transactions.

In addition to detecting, interpreting, processing and storing in one or more different formats data reflecting the above transactions, the in-store device can detect, process and store data reflecting the purchases made by each one of a plurality of cooperating consumer panelists. Thus, the transactions collected by the in-store device enable a "market basket" analysis to be performed by identifying and storing as a group all of the products purchased by each such cooperating customer panelist and, in fact, by each customer of the retail store during each trip through a check-out counter of the retail store.

Each in-store device basically consists of a substantially totally passive or non-invasive sensor assembly, a sensor interface, a store loop communications adapter, a central processing unit, a random access memory, a processed data storage device, a power monitor for determining whether or not the central processing unit is operating properly and a communications modem for connecting the in-store device to a central site communications network. The in-store device may utilize one of a number of conventional data transmission protocols and, if desired, encryption schemes in communicating with the central site to ensure the highest reliability and security of the collected market research data.

Importantly, each in-store device operates in an unattended mode and requires no intervention by the retail store operators or by the retail store's POS terminals, controller or computer. The system and method of the present invention require no software or program modification to each retail store's controller or computer used in controlling the normal operations of each retail store. Each in-store device continuously monitors, detects, interprets, processes and stores data from its retail store under the control of an operating program stored in the in-store device, which program may be periodically updated or modified from the remotely located central site. The central site includes one or more central computers for collecting data from each in-store device in the cooperating retail stores and for further processing the data for subsequent analysis and use by market researchers.

BRIEF DESCRIPTION OF THE DRAWING

The above and other objects and advantages and novel features of the present invention will become apparent from the following detailed description of the preferred embodiment of the present invention illustrated in the accompanying drawing wherein:

FIG. 8 is an illustrative flow chart depicting a portion of the operation of the in-store device of FIG. 2.

DESCRIPTION OF THE PREFERRED EMBODIMENT

System 10 Overview

Figures 1, 2, 3:
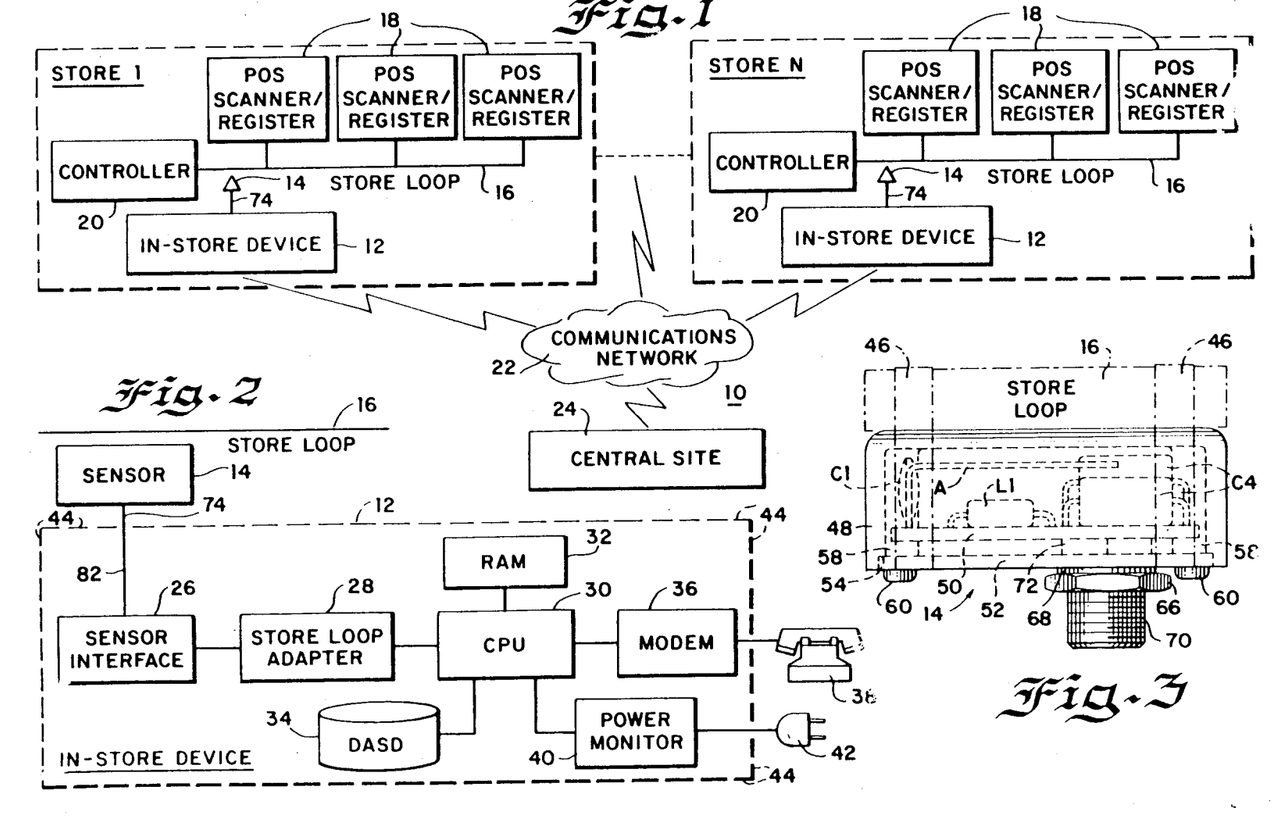
FIG. 1 is a schematic illustration of a market research system and method constructed in accordance with the principles of the present invention.
FIG. 2 is a schematic diagram of a typical in-store device that forms a portion of the system and method of FIG. 1.
FIG. 3 is a side view of a non-invasive sensor assembly disposed physically adjacent to a portion of a store POS terminal/controller loop, constructed in accordance with the principles of the present invention and forming a part of the in-store device of FIG. 2.

Referring initially to FIG. 1 of the drawing, there is illustrated a new and improved market research method and system 10 constructed in accordance with the principles of the present invention. The method and system 10 of the present invention may be used in any market area where there are cooperating retail stores that utilize Point-Of-Sale (POS) optical scanners in their normal retail store operation to detect bar coded information, such as a Universal Product Code (UPC), affixed to the retail products being sold. More specifically, each cooperating retail store in the system 10 is provided with an in-store device 12 that is connected by a sensor assembly 14 to a conventional store data and control loop 16 in a substantially totally passive or non-invasive manner so as not to interfere with or otherwise jeopardize the normal operations of a plurality of POS terminals or optical scanners/registers 18 or of a store controller or computer 20, all of which are interconnected by the store loop 16. Typically, the store's controller 20 controls the operation of the scanners/registers 18 by the exchange of digital data signals through the store loop 16. The sensor assembly 14 preferably is disposed adjacent a portion of the store loop 16 to enable the digital data signals present in the store loop 16 to be detected by the sensor assembly 14 and to be interpreted, locally processed and eventually transmitted by the in-store device 12 through a communications network 22 to a central site 24 for further processing and subsequent analysis and review by market researchers. In accordance with the preferred embodiment of the present invention, the system 10 includes approximately 6,000 in-store devices 12, one in each of approximately 6,000 cooperating retail stores, all connected by the communications network 22 to the central site 24.

Communications Network 22

In the preferred embodiment of the present invention, the communications network 22 through which the in-store devices 12 communicate with the central site 24 consists of a dial-up or switched line telephone connection to a nearby local node on a private X.25 packet-switched data communications network. Such data networks are conventional, per se; and a number of such data networks are currently in commercial operation in this country. For example, a subsidiary of Dun & Bradstreet, Inc. operates such a data network under the name Dunsnet. That data network is currently being used by customers to obtain credit ratings on companies and to obtain market research information reports. Each local node on the Dunsnet information network basically consists of a bank of telephone modems, each such modem connected to a data packet assembler/dissembler. The modems are conventionally accessed by dial-up telephone lines.

In another embodiment of the present invention, the communications network 22 through which the in-store devices 12 communicate with the central site 24 consists of a conventional dial-up or switched line telephone connection from each retail store directly to the central site 24 over a conventional public telephone network.

In an even further embodiment of the present invention, the communications network 22 through which the in-store devices 12 communicate with the central site 24 consists of a radio modem connection to a nearby base station forming a node on a private packet-switched data network as discussed above. The private network is connected directly to the central site 24. An advantage of this embodiment of the present invention is that the radio modem requires no telephone line connection to the in-store device 12. Furthermore, the radio modem is useful when it is inconvenient or otherwise impractical to install a telephone line in a retail store for market research data collection. Suitable radio modems for use in the communications network 22 in accordance with this embodiment of the present invention are available from a number of different manufacturers. For example, a suitable radio modem is a "KDT" TM portable data terminal Model No. N1323A available from Motorola, Inc. and described in a publicly available Motorola instruction manual numbered 68P81035C35-B, copyrighted in 1985 by Motorola, Inc. The serial port on the radio modem is connected to a serial port on the in-store device 12 through an RS-232 adapter. A stored program in the portable data terminal Model No. N1323A relays messages between the radio network and the in-store device 12, providing the equivalent of a 4800 baud continuous communication link between the in-store device 12 and the central site 24.

In another alternative embodiment of the present invention, the communications network 22 through which the in-store device 12 communicates with the central site 24 may take the form of a Very-Small-Aperture-Terminal (VSAT) located on the exterior roof or wall of the retail store for communicating via an over-the-air Ku band microwave link to a transponder in a satellite in a geostationary earth orbit. The satellite is linked to an earth transceiving station at the central site 24. Such satellite communication systems are conventional and commercially available. For example, a representative commercially available satellite communication system is operated by GTE Spacenet under the name SKYSTAR SYSTEM. In using the SKYSTAR SYSTEM in accordance with this embodiment of the present invention, a central Hub Station of the SKYSTAR SYSTEM is located at the central site 24 for communicating in the Ku frequency band via a satellite with the Very-Small-Aperture-Terminals remotely located at the retail stores in the system 10. The communications network 22 constructed in accordance with this embodiment of the present invention requires no telephone line connection to the in-store devices 12 and also may be used when it is inconvenient or otherwise impractical to install a telephone line in a retail store for market research data collection.

In-Store Device 12

In accordance with an important feature of the present invention, the components of each in-store store device 12 are depicted in FIG. 2. As discussed hereinabove, the sensor assembly 14 is disposed adjacent to the store loop 16. For example, the sensor assembly 14 (FIG. 3) may be placed physically adjacent to the electrical signal conductors or cable forming the store loop 16 or adjacent to an electrical connector in the store loop 16, for example, an electrical connector in the vicinity of the controller 20. The sensor assembly 14 detects electrical signals, typically digital data pulses, present in the store loop 16 and passing between the POS scanners/registers 18 and the controller 20. The sensor assembly 14 preferably is substantially totally passive or non-invasive to the store loop 16 and therefore can send no information to the store loop 16. Thus, the sensor assembly 14 and the in-store device 12 cannot interfere with the normal operations of the store loop 16, the scanners/registers 18 and the POS controller or store computer 20.

The in-store device 12 also includes a sensor interface 26 that both supplies low voltage (five volts), direct current electrical power to the sensor assembly 14 and reconstructs the digital data signals present on the store loop 16 from the time varying electrical signals or pulses received from the sensor assembly 14. The store loop digital data signals reconstructed by the sensor interface 26 are provided to a conventional store loop adapter 28 that decodes the digital signals from the sensor interface 26 and passes the decoded information to a Central Processing Unit (CPU) 30. The particular store loop adapter 28 selected for use in the in-store device 12 will obviously depend upon the particular type of scanners/registers 18 and controller 20 in use in that store. The store loop adapter 28 may take the form of a Model AW552 controller available from AW Computer Systems, Inc. of Mt. Laurel, N.J., USA (telephone No. 609/24-3939) for use with store loops 16 having National Cash Register (NCR) registers 18, for example, NCR Models 255, 2552 and 1255 register systems. A similar Model AW3863 controller may be used for a store loop 16 utilizing one or more types of registers 18 manufactured by the IBM Corporation. In addition, the store loop adapter 28 may take the form of a Retail-Net Coprocessor available from Avalon Design and Manufacturing Inc. of Costa Mesa, Calif., USA (telephone No. 714/432-7227). Furthermore, when Model No. DTS545 registers 18 manufactured by Datachecker Systems, Inc. are used, the digital signals transmitted over the store loop 16 have a very simple, asynchronous communications protocol that enables a simple serial input port of the in-store device 12 to be used as the store loop adapter 28.

The operation of the CPU 30 is under the control of a software program contained in a variable or random access memory (RAM) 32. The CPU 30 monitors the incoming data from the store loop adapter 28 and processes that data in accordance with the programmed instructions contained in the RAM 32. Processed data is periodically written onto a direct access storage device (DASD) 34 that may take the form of a hard disk memory. Periodically, i.e., once every several hours or once a day or once every several days or once a week, summarized retail sales transactions formatted by the CPU 30 in accordance with the programmed instructions contained in the RAM 32 may be transferred from the DASD 34 by means of a communications modem 36 to the central site 24.

In a preferred embodiment as depicted in FIG. 2, the modem 36 takes the form of a conventional telephone modem that utilizes a dial-up or switched line telephone 38 for connecting the in-store device 12 to a nearby local node on a private X.25 packet-switched data communications network 22 and then directly to the central site 24. Obviously, if the telephone 38 is shared with the retail store in which the in-store device 12 is located, the communications session between the in-store device 12 and the central site 24 will occur during "off" hours when the telephone 38 is not being used by personnel within the retail store. During a communications session between the in-store device 12 and the central site 24, data corresponding to retail sales transactions collected and stored by the in-store device 12 are up-loaded as discussed above to the central site 24. During the same communications session, the central site 24 can remotely update or change the operating program stored in the RAM 32 and perform testing, as required. The remote updating or change to the operating program stored in the RAM 32 and the remote testing are performed in accordance with standard, well known techniques that are conventional, per se.

The CPU 30, the RAM 32 and the DASD 34 may be embodied in a commercially available IBM Personal System/2 (PS/2) Model 30 microprocessor. The sensor interface 26, the store loop adapter 28 and the communications modem 36 each represent conventional printed circuit boards or cards that may be plugged into the expansion bus of the IBM PS/2 Model 30 microprocessor.

That microprocessor in other applications is designed to operate conventionally in an attended fashion with an operator, a keyboard and a computer display screen. Because that microprocessor preferably operates in an unattended manner when used in the in-store device 12, a power monitor 40 is provided to take the place of an operator, keyboard and display screen. The power monitor 40 is conventional, per se, and basically is used to apply conventional 120 volts alternating current power through a power connector 42 to the microprocessor and also to disconnect power to the microprocessor if the program being executed by the CPU 30 does not reset an internal timer in the power monitor 40 periodically, for example, once every hour. If not properly reset due to a failure in the hardware or software, the power monitor 40 interrupts power to the microprocessor and delays the reapplication of power thereto for a short time, for example, for approximately one minute. Thereafter, the power monitor 40 reapplies power to the microprocessor which then goes through a standard initialization subroutine in order to attempt to obviate whatever failure or malfunction was previously present in the microprocessor.

While the power monitor 40 is a separate unit from the IBM PS/2 Model 30 microprocessor used to form the major portion of the in-store device 12 in accordance with the preferred embodiment of the present invention, all of the components of the in-store device 12 are enclosed within a tamper-proof security enclosure 44 to discourage tampering with the in-store device 12.

Sensor Assembly 14

In accordance with a further important feature of the present invention, the sensor assembly 14 (FIGS. 3-5), used in detecting digital data signals present on the store loop 16, is formed as a small unobtrusive device and includes a molded plastic housing 48 that, in a specific embodiment has a length of approximately 1.75 inches, a width of approximately 1.5 inches and a height or depth of approximately 0.75 inch. The sensor assembly 14 preferably operates on a capacitive principle and, therefore, makes no intrusive physical or electrical connection to the store loop 16. For example, as depicted in FIG. 3, the sensor assembly 16 is disposed physically adjacent to and in physical contact with a portion of the store loop 16. That portion of the store loop 16 depicted in FIG. 3 in dotted line form may be an elongate portion of the data carrying electrical cable of the store loop 16 disposed generally parallel to the length of an antenna A or, alternatively, an electrical connector within the store loop 16. The sensor assembly 14 may be physically secured to that portion of the store loop 16 by any conventional technique, for example, by one or more strips of adhesive tape 46. In the preferred embodiment of the present invention, the sensor assembly 14 is secured to an electrical connector in the store loop 16 immediately adjacent to the controller 20. Alternatively, plastic cable clips (not illustrated) secured to the molded plastic housing 48 may be used securely to attach the sensor assembly 14 to an electrical cable portion of the store loop 16.

Figure 4:
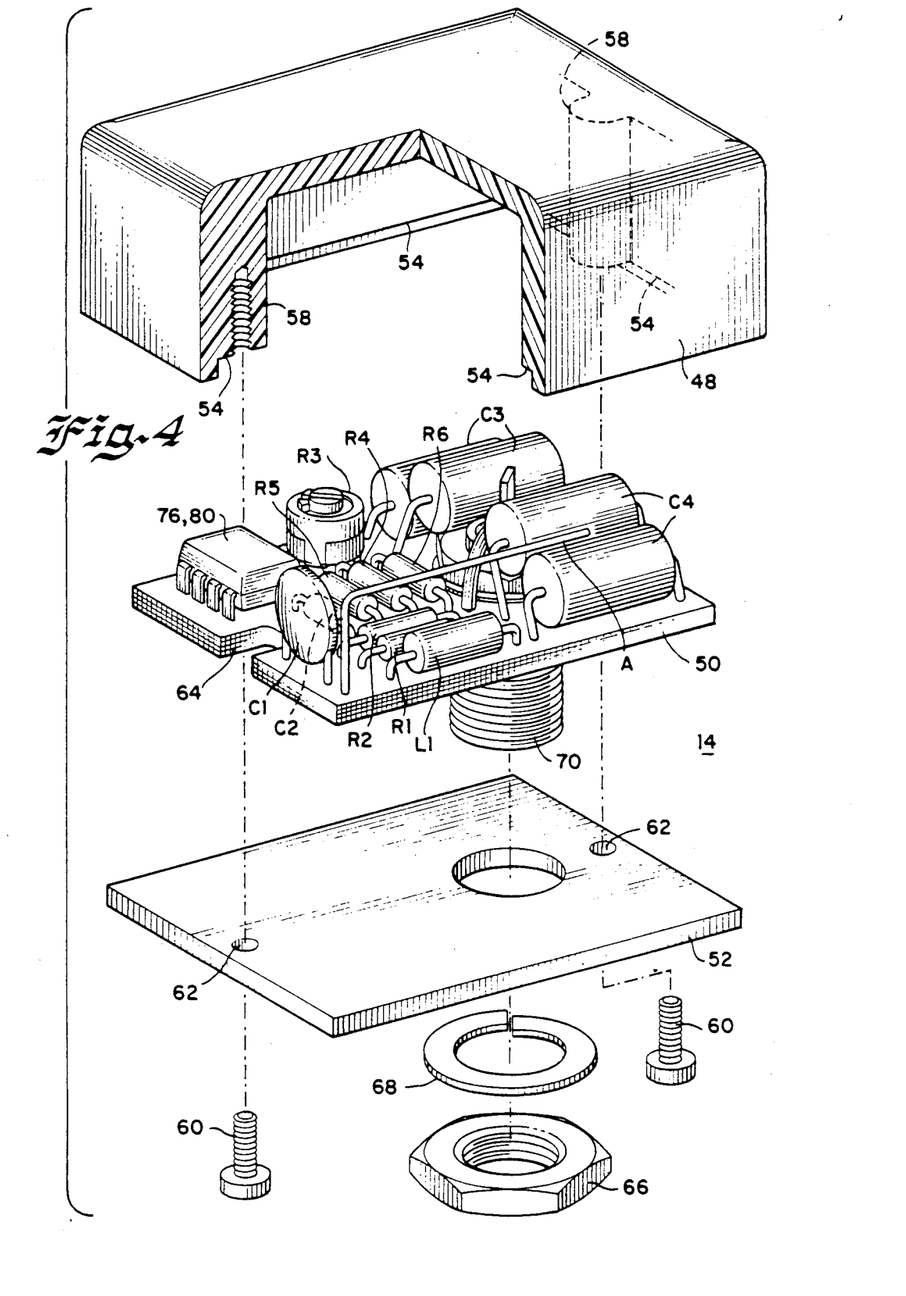
FIG. 4 is an enlarged, broken-away perspective view of the sensor assembly of FIG. 3.

As depicted is FIG. 4, the electrical components of the sensor assembly 14 are mounted on a printed circuit board 50, dimensioned to be received within and securely retained within the housing 48 by a lower end cover 52. The housing 48 includes a lower internally formed recess or ridge 54 dimensioned to receive and position the lower end cover 52 within the housing 48. Preferably, the lower end cover 52 is a rigid, molded plastic component that includes n electrically conductive copper ground plane 56 formed on the interior side of the lower end cover 52 that is disposed beneath and adjacent to the under side of the printed circuit board 50. The housing 48 includes a pair of integrally formed, spaced-apart, internally threaded bosses 58 for receiving and securely retaining a pair of threaded fasteners 60. The fasteners 60 extend through a pair of apertures 62 formed through the lower end cover 52 and through a pair of spaced apart aligned slots or recesses 64 formed in the printed circuit board 50, thereby to secure the printed circuit board 50 and the components mounted thereon and the lower end cover 52 to the housing 48. The sensor assembly 14 also includes a locking nut 66 and a washer 68 for securing the lower end cover 52 to the printed circuit board 50 in a fixed, spaced-apart relationship (FIG. 3). The locking nut 66 is internally threaded for engagement with a downwardly depending, externally threaded elongate coaxial cable connector 70. The printed circuit board 50 is maintained in a fixed, spaced-apart relationship with respect to the lower end cover 52 and the ground plane 56 by a metal spacer 72 (FIG. 3) formed as an enlarged portion of the connector 70. The spacer 72 is physically positioned between and in contact with the ground plane 56 and the lower or under side of the printed circuit board 50.

Figure 5:
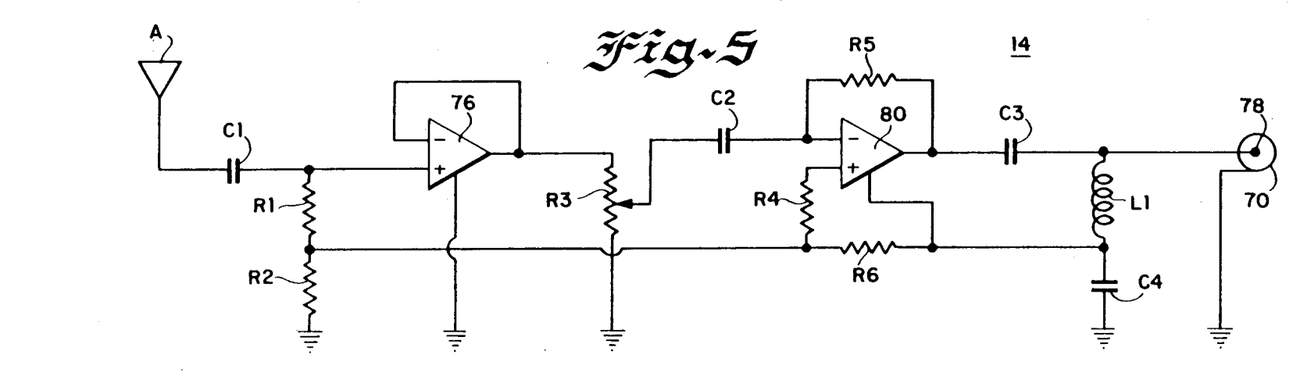
FIG. 5 is an electrical circuit diagram of the sensor assembly of FIGS. 3 and 4.

A preferred embodiment of the electrical circuit of the sensor assembly 14 is depicted in FIG. 5. The electrical components discussed hereinafter with respect to FIG. 5 are also depicted in FIGS. 3 and 4 as mounted on the printed circuit board 50 and as enclosed within the housing 48. The sensor assembly 14 includes the two-conductor, coaxial cable connector 70, the outer conductor of which is directly electrically connected both to the ground plane 56 through the spacer 72 and to the outer conductor of a two conductor coaxial cable 74 (FIGS. 1 and 2) that electrically interconnects the sensor assembly 14 to the sensor interface 26 of the in-store device 12.

When a digital voltage or current signal is present along the electrical cable and connectors forming the store loop 16, the electromagnetic field generated by such a signal is detected by an elongate antenna A that extends above and parallel to the upper surface of the printed circuit board 50. In a specific embodiment of the present invention, the elongate antenna portion of the antenna A is approximately one inch long and extends parallel to and along the length of the upper surface of the printed circuit board 50. As so configured and physically disposed, the antenna A is oriented slightly beneath and along the length of the upper surface of the housing 48 directly beneath a portion of the store loop 16, for example, an elongate conductive cable or electrical connector, to maximize the detection of the electromagnetic field associated with digital signals present in the store loop 16. The antenna A is designed to operate effectively as much as one-half inch away from the store loop 16. The antenna A basically capacitively couples the sensor assembly 14 to an electrically conductive portion of the store loop 16; however, the capacitance of the antenna A in relation to the store loop 16 is extremely small, for example, on the order of 0.001 picofarad. The electromagnetic field detected by the antenna A is in the direction of and proportional to the magnitude of the digital electrical signal present in the store loop 16.

The electrical signal detected by the antenna A is passed by a coupling capacitor C1 to a non-inverting, field-effect transistor input of an operational amplifier 76 which is connected and operates as a high impedance voltage follower. The coupling capacitor C1 blocks any static electric charges that may be present while passing electrical signals detected by the antenna A to the operational amplifier 76. A pair of resistors R6 and R2 are connected as a voltage divider to provide a direct current (DC) voltage of approximately 2.5 volts to the non-inverting input of the operational amplifier 76 through a resistor R1. The operational amplifier 76 basically serves as an impedance matching device with an input impedance on the order of 10 megohms and an output impedance of approximately 10,000 ohms as established by a variable resistor R3. The field-effect transistor input of the operational amplifier 76 enables it to operate effectively at extremely high input impedances.

The sensor assembly 14 receives electrical power of approximately 5 volts DC from the sensor interface 26 via the center conductor 78 of the connector 70. The electrical power received from the sensor interface 26 to operate the sensor assembly 14 is blocked at its input by a coupling capacitor C3 and is routed through a low pass filter circuit formed by an inductor L1 and a capacitor C4 to provide power to the operational amplifier 76 and to a second operational amplifier 80. The resistors R2 and R6 form a voltage divider to supply the desired amount of bias voltage to the operational amplifier 80 through a resistor R4.

The output signal from the operational amplifier 76 is attenuated by the variable resistor R3 which serves as a trimmer potentiometer; and the attenuated signal is supplied through a coupling capacitor C2 to the operational amplifier 80 that is connected as a differentiator or high pass filter. The capacitor C2 and a feedback resistor R5 connected to the inverting input of the operational amplifier 80 configure the operational amplifier 80 to function as desired as a differentiator. The output signal from the operational amplifier 80 consists of a series of positive or negative going electrical pulses that represent signal transitions, i.e., the leading and trailing edges of electrical signals, on the store loop 16. The frequency of the output signal of the operational amplifier 80 depends on the frequency of the signals present on the store loop 16. The output signal from the operational amplifier 80 is passed through the coupling resistor C3 to the center conductor 78 of the coaxial cable connector 70 and from there via a coaxial cable 82 (FIG. 2) to the sensor interface 26. The signal present on the center conductor of the coaxial cable 82 is a composite signal formed by the 5 volt DC power component to which is added the time varying output signal from the sensor assembly 14 having, for example, an amplitude of approximately 100 millivolts, positive or negative, and a pulse width on the order of approximately 1 microsecond.

The input impedance of the sensor assembly 14 is approximately 10 megohms; and the output impedance is approximately 600 ohms. The frequency response of the sensor assembly 14 is from approximately 20,000 Hz to approximately 400,000 Hz. As described hereinabove, the sensor assembly 14 behaves essentially as a low frequency, broad band amplifier to enable the sensor interface 26 to reconstruct digital data signals of various encoding schemes and of various transmission rates present on the store loop 16.

Suitable component values for the electrical components of the sensor assembly 14 are set forth below:

| Electrical Component | Component Value |
| --- | --- |
| A | Approximately 1 inch long |
| C1 | 100 picofarads |
| C2 | .004 microfarads |
| C3, C4 | 220 microfarads |
| L1 | 1 millihenry |
| R1 | 10 megohms |
| R2, R3, R4, R5, R6 | 10,000 ohms |

The operational amplifiers 76 and 80 may be component parts of a single integrated circuit available from any one of a number of different manufacturers. For example, a model LM353 operational amplifier have been found to be suitable for use as the operational amplifier 76 or the operational amplifier 80. For space considerations, two smaller capacitors may be connected electrically in parallel to form each of the capacitors C3 and C4 (FIGS. 3-4).

Sensor Interface 26

Figure 6:
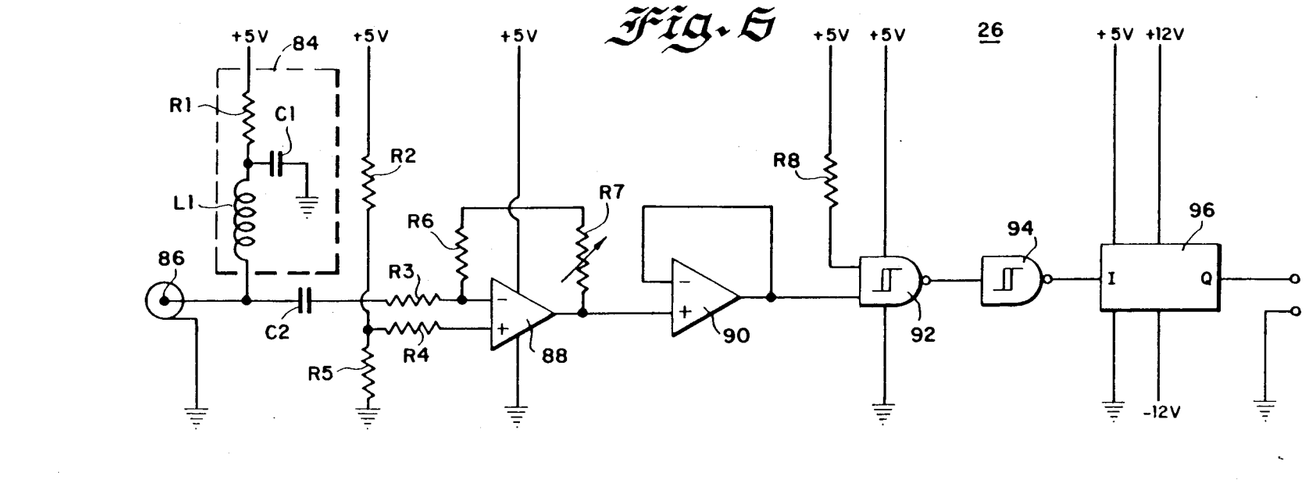
FIG. 6 is an electrical circuit diagram of a sensor interface that forms a portion of the in-store device of FIG. 2.

The electrical circuit diagram for the sensor interface 26 is depicted in FIG. 6. The sensor interface 26 is located within the in-store device 12 and includes a sensor power interface 84 formed by a resistor R1, an inductor L1 and a capacitor C1. The sensor power interface 84 provides the low voltage, direct current power to operate the active components of the sensor assembly 14. Power from the power interface 84 is blocked from the rest of the circuitry of the sensor interface 26 by a coupling capacitor C2. The inductor L1 blocks the high frequency signal component present on the signal lead from the sensor assembly 14. The coupling or input capacitor C2 blocks the direct current from a variable gain operational amplifier 88 while passing the input pulses from the sensor assembly 14 to the inverting input of the operational amplifier 88. The amplifier 88 is connected as an inverting amplifier; and the non-inverting input of the amplifier 88 is biased to direct current voltage level of approximately +2.5 volts through the resistors R2, R4 and R5. The gain of the amplifier 88 is adjusted from a minimum gain of approximately unity to a maximum gain of approximately eleven by adjusting the variable feedback resistor R7. The gain of the amplifier 88 is set when the in-store device 12 is initially installed in a particular retail store to provide the proper output signals to the store loop adapter 28 depending upon the particular characteristics of the store loop 16 and of the scanners/registers 18 and of the controller or store computer 20.

The output of the amplifier 88 is provided to the non-inverting input of an operational amplifier 90 connected as a unity-gain voltage follower, the output of which is fed to a Schmitt Trigger 92 that is connected as a NAND gate and that provides noise immunity to or suppression of signals having magnitudes less than the expected magnitudes of signals of interest. In addition, it provides an output digital signal having rapid rise times as compared to the slower rise times associated with the input signal to the Schmitt Trigger 92.

When a positive going pulse from the amplifier 90 exceeds a threshold level of the Schmitt Trigger 92, the Schmitt Trigger 92 switches to a low output voltage level. If the output voltage from the amplifier 90 falls below a second, lower threshold level, the Schmitt Trigger 92 switches to a high output voltage level.

A second Schmitt Trigger 94 connected as a NAND gate serves as an inverter for providing an input signal of proper polarity to a conventional line driver 96. The line driver 96 is a standard RS232 line driver that converts an input signal having a logic level 1 to an output signal with a −12 volt DC level. Similarly, an input signal having a logic level 0 is converted to a +12 volt DC output signal. The amplifiers 88 and 90, the Schmitt Triggers 92 and 94 and the line driver 96 are conventional integrated circuits available from any one of a number of integrated circuit manufacturers.

Specific values of the electrical components used in the electrical circuit (FIG. 6) for the sensor interface 26 are as follows:

| Electrical Component | Component Value |
| --- | --- |
| C1 | 1 microfarad |
| C2 | .01 microfarad |
| L1 | 1 millihenry |
| R1 | 22 ohms |
| R2, R3, R4, R5, R6, R8 | 10,000 ohms |
| R7 | 100,000 ohms |

The output signal from the sensor interface 26 via the line driver 96 is suitable for use as an input signal to any one of a variety of different types of store loop adapters 28 discussed hereinabove.

Central Site 24

Figures 6, 7:
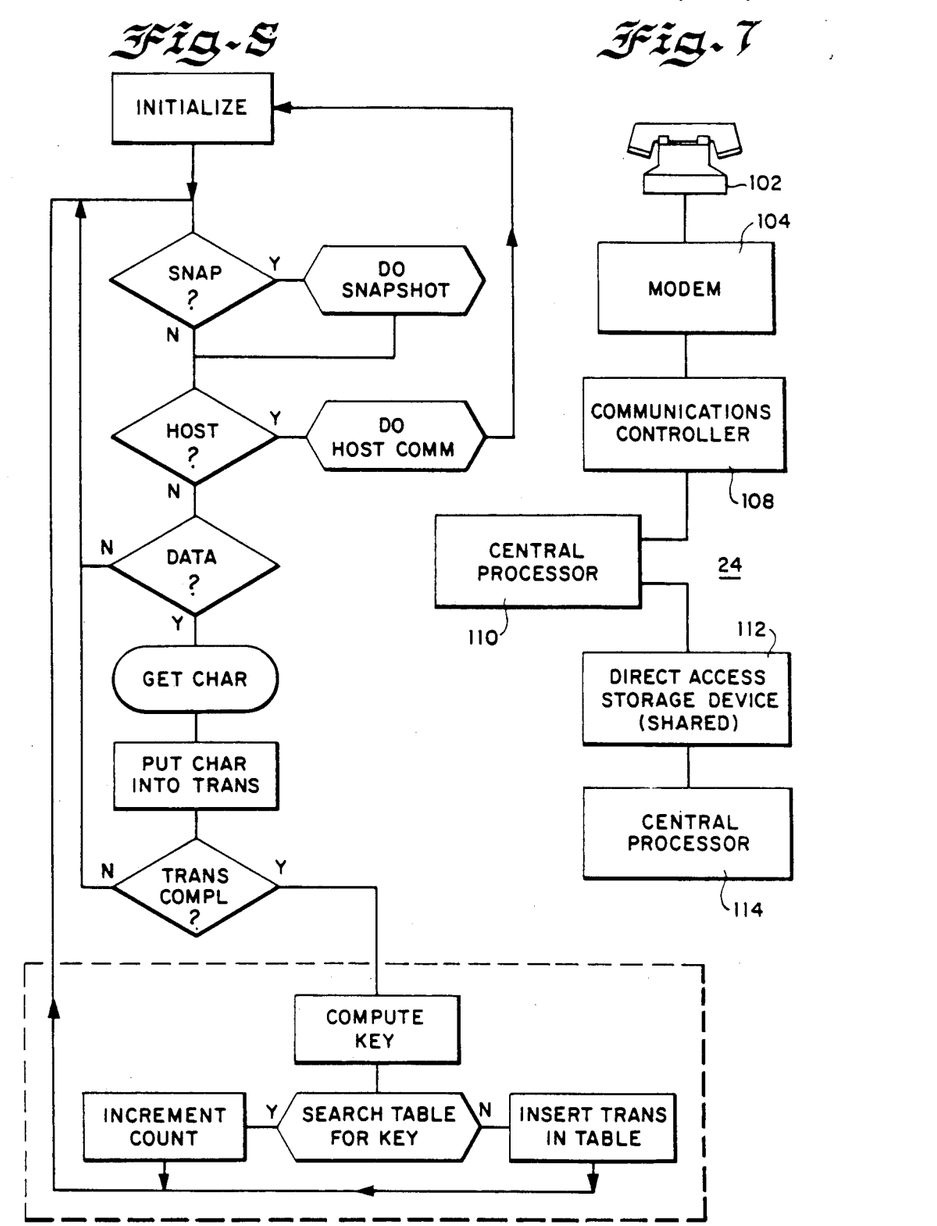
FIG. 7 is a schematic diagram of the components of the system and method of FIG. 1 located at the central site.

FIG. 7 is a schematic diagram of typical components of the market research system 10 that would be located at the central site 24 of the system 10. As depicted, a telephone 102 represents a telephone connection from the communications network 22 to a conventional telephone modem 104 that, in turn, is connected to an IBM model 3725 communications controller 108. The communications controller 108 is directly connected to an IBM model 3090-200 central processor 110 for enabling the central processor 110 to communicate with the communications network 22. The central processor 110 is a very large central processing unit that receives incoming data from the many retail stores in the system 10 through the communications network 22 and that formats that data for further processing at the central site 24. In addition, the central processor 110 formats output data for delivery to customers of the market research system 10 and also handles the updating of or modifications to the operating instructions or programs stored in the RAMs 32 of the in-store devices 12.

After initial editing and formatting, the incoming data from the communications network 22 is transferred to a shared, very large direct access storage device (DASD) 112. The DASD 112 serves as a very large data base having a storage capacity of billions of bytes of information. Any one of a number of commercially available data storage devices, for example, IBM model 3380 memory devices, may be interconnected or configured to form the DASD 112 at the central site 24.

An IBM model 3090-600 central processor 114 shares the DASD 112 with the central processor 110 and is used to perform the many calculations required on the input data delivered from the retail stores and also to perform statistical calculations necessary in producing output reports for customers of the market research system 10.

Operation of System 10

FIG. 8 depicts a flowchart setting forth the basic operation of the system 10 and, more particularly, of each in-store device 12. The various steps depicted in the flowchart of FIG. 8 are carried out by the CPU 30 (FIG. 2) under the control of the operational instructions or program contained in the RAM 32, as periodically updated or modified by downloaded data and instructions from the remotely located central processor 110.

An initialization subroutine is executed upon power-up of the in-store device 12 and after each communications session with the central site 24. The real-time clock contained in the in-store device 12 is synchronized with the last time check received from the central site 24. Unneeded "snapshot" memory files contained in the RAM 32 are deleted; and the monitoring program for controlling the operation of the in-store device 12 through the CPU 30 is loaded into the RAM 32 and initiated.

The above initialization subroutine is followed by a "SNAP?" subroutine which determines if a "snapshot" of the data temporarily stored in the RAM 32 should be taken. Typically, all collected and processed data from the store loop 16 temporarily stored in the RAM 32 are removed from the RAM 32 and stored in any one of a number of different formats in the DASD 34. This transfer of data from the RAM 32 to the DASD 34 is performed every few minutes so that, in the case of a power outage to the in-store device 12, the device 12 can automatically recover and resume the operations it was performing at the time of the power outage.

If a "snapshot" is to be taken, a "DO SNAPSHOT" subroutine is executed during which the data files temporarily stored in the RAM 32 are transferred to the DASD 34; and a timer is set to indicate when the next "snapshot" subroutine is to be executed.

Thereafter or in the event that a "snapshot" subroutine is not to be executed, a "HOST?" subroutine is executed. This subroutine determines if a communications session with the central site 24 is to be executed by the in-store device 12. Each in-store device 12 is assigned a periodic communications session schedule, for example, a nightly communications schedule, along with alternative times if an attempt to establish communications with the central site 24 is unsuccessful.

If it is time for a communications session with the central site 24, a "DO HOST COMMUNICATIONS" subroutine initially writes any necessary information files, for example, files containing performance data relating to the operation of the in-store device 12, to the DASD 34. During this subroutine, active monitoring of the store loop 16 is interrupted.

A conventional communications subroutine is then initiated which controls the transfer of data and instructions between the in-store device 12 and the central site 24. A typical communications session initially involves determining whether the telephone 38 (FIG. 2) is in use and, assuming it is not in use, accessing the telephone 38 and dialing the telephone number of the nearest local node on the private packet-switched data network referred to hereinabove. If a telephone connection is successfully established with a node on the data network, network routing commands are exchanged in order to establish a connection between the in-store device 12 and the central site 24. Assuming that a connection is successfully established with the central site 24, a series of log-on and password or security commands are transmitted to prevent unauthorized access to the central site 24.

Once a communications session is successfully established with the central site 24, the in-store device 12 issues commands to upload its data files from the DASD 34 to the central processor 110 and the DASD 112. In addition, status and diagnostic data may be uploaded at this time from the in-store device 12 to the central site 24. Subsequently, various parameters, such as the time to initiate a communications session, may be downloaded from the central site 24 to the in-store device 12 along with updated or modified programs or operating instructions for controlling the operation of the in-store device 12. Clock synchronization data is then downloaded from the central site 24 to the in-store device 12 for use in the initialization subroutine referred to hereinabove. The communications subroutine being executed by the CPU 30 in the in-store device 12 then logs-off from the central site 24 and from the communications network 22 and restores the telephone 38 to its normal status in which it is available for use by personnel within the retail store. After such a "DO HOST COMMUNICATIONS" subroutine, the CPU 30 executes the initialization subroutine referred to above.

In the event that it is not time for a communications session with the central site 24, a "DATA?" subroutine is executed in which it is determined whether or not there is any data present in a buffer memory in the store loop adapter 28 awaiting processing by the CPU 30. If no data is present in the buffer memory of the store loop adapter 28, control passes to the "SNAP?" subroutine discussed above.

If data is present in the buffer memory of the store loop adapter 28, a "GET CHARACTER" subroutine is performed. This subroutine obtains a single data character from the buffer memory in the store loop adapter 28 and temporarily stores it in a pending buffer memory if that character is part of a transaction of interest.

Subsequently, a "PUT CHARACTER INTO TRANSACTION" subroutine decodes the character received from the buffer memory of the store loop adapter 28 and builds a complete transaction of interest, one character at a time. For example, when a retail product is scanned by the scanner/register 18, a signal is passed by the store loop 16 to the controller 20 identifying the specific scanner/register 18 involved in that transaction. Subsequently, the function being performed in the transaction, for example, the function of scanning, is normally identified, typically followed by a twelve character Universal Product Code (UPC) and, possibly, by the quantity of the items purchased with that specific code. Typically, the above information is accumulated by the controller 20, one character at a time. When the information is complete, the controller 20 normally responds with both the current price and a description of the item that was scanned, which information is addressed to the particular scanner/register 18 that performed the scanning operation. The above information constitutes a typical retail sales transaction that is monitored and built up one character at a time by the in-store device 12 via this program subroutine.

Control then passes to a "TRANSACTION COMPLETE?" subroutine that determines whether a transaction has been completely collected. A particular transaction might involve twenty-five to thirty characters so that the above operational loop may have to be executed at least that many times in order to arrive at a complete transaction. Typically, a complete transaction is signified by either an end of transmission character or by getting the last character of the descriptive information involved in the transaction.

If all of the characters have been received to form a complete retail sales transaction, then the data may be stored, initially in the RAM 32, in any one of a number of different desired formats. For example, an illustrative process and format for storing a retail sales transaction is set forth within the dotted lines of FIG. 8. As depicted, a "COMPUTE KEY" subroutine constructs a "key" or identification code for the retail sales transaction. The key may be composed of the Universal Product Code corresponding to the scanned retail item appended with the unit price at which the retail item was sold. Subsequently, a "SEARCH TABLE FOR KEY" subroutine is performed in which a data table in the RAM 32 is searched to determine if the key constructed during the previous subroutine exists in the RAM 32. The data table in the RAM 32 contains keys previously constructed in accordance with the above-mentioned "COMPUTE KEY" subroutine. The data table is arranged in a conventional, well known binary tree structure that enables extremely rapid searches through the data table which may contain over 30,000 different keys corresponding to 30,000 different UPC/unit price combinations.

If the key is located in the data table, an "INCREMENT COUNT" subroutine is performed in which the quantity sold field in the RAM 32 associated with that key is incremented by the amount of the quantity sold field in the transaction being processed. Thereafter, the program returns to the "SNAP?" subroutine.

Alternatively, if the key for the transaction being processed was not located in the data table in the RAM 32, an "INSERT TRANSACTION IN TABLE" subroutine is executed by which the computed key for the transaction is inserted in the appropriate place in the data table in the RAM 32 and the quantity sold field in the RAM 32 for that key is set to the amount of the quantity sold field in the transaction. The program then returns to the "SNAP?" subroutine.

Obviously, many modifications and variations of the present invention are possible in light of the above teachings. For example, retail sales transactions determined to be complete, as discussed hereinabove, may be formatted and stored initially in the RAM 32 and subsequently in the DASD 34 in many different desired formats. Importantly, complete retail sales transactions may be organized for use in "market basket" analyses by grouping together retail sales transactions corresponding to all of the purchases made by each customer during a single trip through the check-out line in the retail store. All retail sales transactions occurring prior to the determination of the total amount owed by a customer for the purchase of the retail items presented to a checker during a trip through a check-out line in the retail store can be grouped together by the CPU 30 and the RAM 32 for subsequent transfer to the DASD 34 in the in-store device 12. From this information, an average "market basket" in the form of the types or quantities of retail items purchased or in the form of the cost of the items purchased can be determined for each retail store or, if desired, for a designated group of retail stores in the market research system 10. Alternatively, a unique identification code either scanned or keyed into the scanner/register 18 can be used as a key to identify a "market basket", i.e., the items purchased and their cost, of each cooperating panelist in the market research system 10.

Furthermore, the operation of the in-store device 12 including the formatting and storing of complete retail sales transactions by the in-store device 12 may be updated or modified during a communications session between the in-store device 12 and the remotely located central site 24. The market research system 10 is highly flexible in that the market research test area, i.e., the area in which the cooperating retail stores of the system 10 are located, may be selected as desired. For example, the market research test area may involve a single geographic locality, such as a city, county or state, or a single geographic region, such as a portion of a country, or an entire country, such as the United States of America, or even several countries, such as the United States of America and Canada. Thus, it is to be understood that, within the scope of the appended claims, the invention may be practiced otherwise than as specifically described hereinabove.

What is claimed and is desired to be secured by Letters Patent is:

1. A market research system comprising:
    a plurality of cooperating retail stores in a market research test area, each of said stores having at least partially automated first means for processing retail sales transactions in the normal operation of said retail store,
    non-invasive automated second means disposed in each of said stores for monitoring said first means in a substantially totally passive manner and for collecting market research data based on said retail sales transactions, said second means including sensor means for monitoring and for detecting said processed retail sales transactions and processor means coupled to said sensor means for processing said detected retail sales transactions,
    said first means operating independently of said second means, said second means operating responsive to said first means without requiring any responsive operation by said first means and without requiring any modification of said first means, and
    automated third means remotely located from said plurality of retail stores for receiving said market research data from said plurality of retail stores and for storing said market research data for subsequent use by market researchers.

2. A market research system as recited in claim 1 wherein said sensor means for monitoring said first means includes an antenna.

3. A market research system as recited in claim 2 wherein said first means generates first electrical signals relating to said retail sales transactions and wherein said antenna is physically disposed in the vicinity of said first means for enabling at least portions of said first electrical signals to be detected by said antenna.

4. A market research system as recited in claim 3 wherein said second processor means further includes microprocessor means for processing and storing retail sales transaction data detected by said antenna, said microprocessor means being otherwise adapted to process and store said retail sales transaction data independently of said first means.

5. A market research system as recited in claim 4 wherein said second means further includes adapter means for adapting said second means to a particular first means in said store in which said second means is disposed for enabling said microprocessor to process said retail sales transaction data detected by said antenna.

6. A market research system as recited in claim 4 wherein said second means further comprises communications modem means for enabling said second means to transfer said market research data to said third means.

7. A market research system as recited in claim 4 wherein said third means further comprises means for remotely reprogramming said microprocessor.

8. A market research system as recited in claim 1 further comprising means for transferring said market research data from said second means to said third means.

9. A market research system as recited in claim 8 wherein said transferring means comprises a telephone connection between said second means and said third means.

10. A market research system as recited in claim 8 wherein said transferring means comprises a radio frequency modem disposed in at least one of said plurality of retail stores for transferring market research data over-the-air from said second means.

11. A market research system as recited in claim 8 wherein said transferring means comprises a data communications network for transferring said market research data from said second means to said third means via an earth orbiting satellite.

12. A market research system as recited in claim 1 wherein said third means comprises automated central processing means for processing said market research data and data storage means for storing said market research data.

13. A market research system as recited in claim 1 wherein said market research test area comprises an entire country.

14. A market research system as recited in claim 1 wherein said first means comprises at least one optical UPC scanner and an automated scanner controller, said scanner and said controller being interconnected by a digital data store communications loop.

15. A market research system as recited in claim 14 wherein said second means includes sensor means for monitoring said store loop, said sensor means including antenna means for detecting digital data present on said store loop representative of said retail sales transactions.

16. A market research system as recited in claim 1 wherein said second means further includes microprocessor means for processing said digital data detected by said antenna means, said microprocessor means being otherwise adapted to collect said retail sales transaction data represented by said digital data independently of said first means.

17. A market research system comprising
a plurality of cooperating retail stores in a market research test area, each of said stores having at least partially automated first means for processing retail sales transactions in said store,
non-invasive automated second means disposed in each of said stores for monitoring said first means in a substantially totally passive manner and for collecting market research data based on said retail sales transactions, said second means including sensor means for monitoring said first means, said sensor means including an antenna, said second means further including microprocessor means for processing and storing retail sales transaction data detected by said antenna, said microprocessor means being otherwise adapted to process and store said retail sales transaction data independently of said first means, and said microprocessor including a central processing unit, variable memory means and retail sales transaction data storage means, said second means further including adapter means for adapting said second means to a particular first means in said store in which said second means is disposed for enabling said microprocessor to process said retail sales transaction data detected by said antenna, and
automated third means remotely located from said plurality of retail stores for receiving said market research data from said plurality of retail stores and for storing said market research data for subsequent use by market researchers,
said first means operating independently of said second means, and said first means generating first electrical signals relating to said retail sales transactions,
wherein said antenna is physically disposed in the vicinity of said first means for enabling at least portions of said first electrical signals to be detected by said antenna, and
wherein said second means further comprises interface means disposed between said sensor means and said adapter means for supplying electrical power to said sensor means and for supplying second electrical signals representative of said first electrical signals to said adapter means.

18. A market research system as recited in claim 17 wherein said electrical power and said second electrical signals are transmitted simultaneously between said sensor means and said interface means over the same electrical conductors.

19. A market research system as recited in claim 18 wherein said sensor means includes high pass filter means for suppressing spurious signals and impedance matching means for interconnecting said antenna and said high pass filter means.

20. A market research system as recited in claim 19 wherein at least one of said high pass filter mens and said impedance matching means comprises an operational amplifier that is powered by said electrical power from said interface means.

21. A market research system as recited in claim 20 wherein both of said high pass filter means and said impedance matching means comprise operational amplifiers that are powered by said electrical power from said interface means.

22. A market research system as recited in claim 17 wherein said interface means comprises power supply means for supplying low voltage direct current power to said sensor means and amplifying means for amplifying at least portions of time varying signals received from said sensing means.

23. A market research system as recited in claim 22 wherein said interface means further comprises means for suppressing spurious time varying signals and for increasing the rise times of non-spurious time varying signals.

24. A market research system as recited in claim 23 wherein said suppressing means comprises at least one Schmitt Trigger device.

25. A market research system as recited in claim 22 wherein said interface means further comprises line driver means for providing a digital logic signal of a required amplitude from said interface means to said adapter means.

26. A market research data collection system comprising
a plurality of cooperating retail stores, each of said stores having automated first means for processing retail sales transactions in said store, said first means comprising at least one point-of-sale scanner and an automated scanner controller, said scanner and said controller being interconnected by a digital data store communications loop,
non-invasive automated second means disposed in each of said stores for monitoring said store loop in a substantially totally passive manner and for collecting market research data based on said retail sales transactions, said second means including antenna means physically disposed adjacent to a portion of said store loop for detecting digital data present on said store loop representative of said retail sales transactions, said second means further including microprocessor means, including a central processing unit, variable memory means and retail sales transaction data storage means, for processing said digital data detected by said antenna means, said microprocessor means being otherwise adapted to collect said retail sales transaction data represented by said digital data independently of said first means, said second means further including adapter means for adapting said second means to a particular first means in said store in which said second means is disposed for enabling said microprocessor to process said digital data detected by said antenna means, and third means remotely located from said plurality of retail stores for receiving said market research data from said plurality of retail stores and for storing said market research data wherein the only electrical signal connection between said first means and said second means is through said antenna means, and wherein said antenna means comprises part of a sensor assembly disposed adjacent to said portion of said store loop for monitoring said digital data present on said store loop and wherein said second means further comprises interface means disposed between said sensor assembly and said adapter means for supplying low voltage, direct current electrical power to said sensor assembly and for supplying time varying electrical signals representative of said digital data detected by said antenna means to said adapter means.

27. A market research data collection system as recited in claim 26 wherein said electrical power and said electrical signals are transmitted simultaneously between said sensor assembly and said interface means over the same electrical conductors.

28. A retail store data collection system for use in a retail store having at least one Point-Of-Sale scanner and a scanner controller interconnected by a store data communications loop comprising:
sensor means disposed in the vicinity of a portion of said store loop for monitoring and for detecting data signals present on said store loop,
memory means coupled to said sensor means for storing information in response to the detection of said data signals by said sensor means, and
said sensor means and said memory means operating responsive to said scanner and scanner controller and without requiring any responsive operation by said scanner and said scanner controller and without requiring any modification of said scanner and said scanner controller.

29. A retail store data collection system as recited in claim 28 wherein said data signals present on said store loop comprises digital data signals.

30. A method of collecting market research data from a plurality of cooperating retail stores, each store of said plurality of stores having at least one Point-Of-Sale scanner and a scanner controller and a store digital data communications loop interconnecting said scanner and said scanner controller, said method comprising the steps of disposing non-invasive sensor means in each of said stores for monitoring and for detecting in a substantially totally passive manner with respect to said scanner and said scanner controller and said store loop digital data present on said store loop, said detected digital data being representative of retail sales transactions in said store,
detecting said digital data present in said store loop,
storing information in response to the detection of said digital data in a memory, said memory being separate from said scanner and said scanner controller in said store, said sensor means and said memory operating responsive to the normal retail sales operations of said scanner and said scanner controller in said retail store and
transmitting said information from said retail store to a remote central location, said transmitted information for processing, storage and use by market researchers.

31. A method of collecting market research data concerning retail sales transactions occurring in each store of a plurality of cooperating retail stores, each cooperating retail store having a first automated system for processing the retail sales transactions, said method comprising the steps of:
monitoring said first automated system and detecting in a substantially totally passive manner electrical data signals present in said store representative of said retail sales transactions,
storing information in response to the detection of said electrical data signals in a memory, said memory being located in said store and being separate from said first automated system in said store for processing said retail sales transactions and the normal operations of said store and
periodically sending said information stored in said memory from said store to a remote location for subsequent use by market researchers.

32. A market research data collection system comprising
a plurality of cooperating retail stores, each store of said plurality of stores having automated first means for processing retail sales transactions in said store, said first means comprising at least one Point-Of-Sale optical scanner and an automated scanner controller and a digital data store communications loop interconnecting said scanner and said controller,
non-invasive automated second means disposed in each store of said plurality of stores for monitoring said store loop and for collecting information based on said retail sales transactions useful in performing "market basket" analyses, said second means including sensor means for monitoring and for detecting digital data present on said store loop, said detected digital data being representative of said retail sales transactions, and said second means otherwise operating independently of said scanner and said scanner controller and said store loop and without requiring any responsive operation by said scanner and said scanner controller and without requiring any modification of said scanner and said scanner controller and
third means remotely located from said plurality of retail stores for receiving said information from said second means for further processing, storage and subsequent use by market researchers in performing "market basket" analyses.

* * * * *